United States Patent
Toeda et al.

(10) Patent No.: US 11,672,049 B2
(45) Date of Patent: Jun. 6, 2023

(54) RADIO BASE STATION AND COMMUNICATION CONTROL METHOD

(71) Applicant: NTT DOCOMO, INC., Tokyo (JP)

(72) Inventors: Teruaki Toeda, Tokyo (JP); Tooru Uchino, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/636,829

(22) PCT Filed: Aug. 8, 2018

(86) PCT No.: PCT/JP2018/029743
§ 371 (c)(1),
(2) Date: Feb. 5, 2020

(87) PCT Pub. No.: WO2019/031541
PCT Pub. Date: Feb. 14, 2019

(65) Prior Publication Data
US 2020/0374982 A1    Nov. 26, 2020

(30) Foreign Application Priority Data

Aug. 10, 2017 (JP) ............................. JP2017-156204

(51) Int. Cl.
*H04W 92/12*    (2009.01)
*H04W 16/26*    (2009.01)
*H04W 72/23*    (2023.01)
*H04W 72/51*    (2023.01)
*H04W 88/08*    (2009.01)
*H04W 24/02*    (2009.01)

(52) U.S. Cl.
CPC ............ *H04W 92/12* (2013.01); *H04W 16/26* (2013.01); *H04W 72/23* (2023.01); *H04W 72/51* (2023.01); *H04W 88/085* (2013.01); *H04W 24/02* (2013.01)

(58) Field of Classification Search
None
See application file for complete search history.

(56) References Cited

U.S. PATENT DOCUMENTS

| 2017/0208516 | A1* | 7/2017 | Kubota | ............... H04L 5/005 |
| 2018/0324635 | A1* | 11/2018 | Babaei | ............... H04W 72/21 |
| 2019/0150220 | A1* | 5/2019 | Byun | ............... H04W 68/02 |
| | | | | 370/329 |

(Continued)

OTHER PUBLICATIONS

Fiorani, U.S. Appl. No. 62/651,392, filed Apr. 2, 2018 (Year: 2018).*

(Continued)

*Primary Examiner* — Jay L Vogel
(74) *Attorney, Agent, or Firm* — Osha Bergman Watanabe & Burton LLP

(57) ABSTRACT

A central unit (210) holds a plurality of parameters for controlling radio communication. A distributed unit (260) also holds a plurality of parameters for controlling the radio communication. A radio base station manages the parameters to be held by the central unit (210) and the distributed unit (260). The radio base station causes a coordination necessary parameter, which is a parameter for which a coordination is necessary between the plurality of the parameters, to be held in only one of the central unit (210) and the distributed unit (260).

4 Claims, 8 Drawing Sheets

(56) References Cited

U.S. PATENT DOCUMENTS

| | | | | |
|---|---|---|---|---|
| 2019/0327133 | A1* | 10/2019 | Gao | H04W 48/16 |
| 2020/0084808 | A1* | 3/2020 | Oak | H04L 69/321 |
| 2020/0162998 | A1* | 5/2020 | Zhang | H04W 48/10 |
| 2020/0178326 | A1* | 6/2020 | Sirotkin | H04W 76/12 |
| 2020/0236572 | A1* | 7/2020 | Yiu | H04L 5/0057 |
| 2021/0059002 | A1* | 2/2021 | Fiorani | H04W 92/20 |
| 2021/0144658 | A1* | 5/2021 | Han | H04L 5/0053 |
| 2021/0168677 | A1* | 6/2021 | Fu | H04W 36/00835 |
| 2021/0211916 | A1* | 7/2021 | Liu | H04W 76/15 |

OTHER PUBLICATIONS

Sirotkin U.S. Appl. No. 62/521,958, filed Jun. 19, 2017 (Year: 2017).*

3GPP TSG RAN WG3 Meeting #95; R3-170382 "Consideration on the protocol stack and functions of CU/DU interface" CATT; Athens, Greece; Feb. 13-17, 2017 (4 pages).

3GPP TSG RAN WG3 Meeting #97bis; R3-173879 "F1 parameter control update" NTT Docomo, Inc.; Prague, Czech Republic; Oct. 9-13, 2017 (6 pages).

Extended European Search Report issued in European Application No. 18843909.5, dated Mar. 19, 2021 (13 pages).

International Search Report issued in PCT/JP2018/029743 dated Oct. 23, 2018 (1 page).

Written Opinion of the International Searching Authority issued in PCT/JP2018/029743 dated Oct. 23, 2018 (4 pages).

KT Corp.; "Consideration for NR RAN internal interface for higher layer functional split"; 3GPP TSG RAN WG3 Meeting #93bis, R3-162349; Sophia Antipolis, France; Oct. 10-14, 2016 (4 pages).

Samsung, KT, SK Telecom; "F1 interface setup and the delivery of gNB-DU capability"; 3GPP TSG-RAN WG3 Meeting #96, R3-171703; Hangzhou, P.R. China; May 15-19, 2017 (4 pages).

Ericsson; "On the functional distribution over the F1 interface"; 3GPP TSG-RAN WG3 #96, Tdoc R3-171727 Hangzhou, China; May 15-19, 2017 (10 pages).

NTT Docomo, Inc.; "F1 interface: Radio resource configuration management"; TSG-RAN Working Group 3 meeting #96, R3-171823; Hangzhou, China; May 15-19, 2017 (4 pages).

Office Action issued in the counterpart Indian Patent Application No. 202037005944, dated Mar. 9, 2022 (6 pages).

Office Action issued in Chinese Application No. 201880050302.6; dated Dec. 15, 2022 (16 pages).

* cited by examiner

FIG. 8

| PARAMETER TYPE | 5G-CU | 5G-DU |
|---|---|---|
| UNITS OF UE | Yes | – |
| UNITS OF CELL | – | Yes |
| COORDINATION NECESSARY<br>• Measurement gap<br>• DRX<br>• UL dedicated resource (PUCCH/CRS/SRS)<br>• TRANSMISSION TIMING OF NOTIFICATION INFORMATION<br>• TRANSMISSION/RECEPTION TIMING OF CSI-RS | OPERATION EXAMPLE 2 | OPERATION EXAMPLE 1 |

RADIO BASE STATION AND COMMUNICATION CONTROL METHOD

TECHNICAL FIELD

The present invention relates to a radio base station including a central unit and a distributed unit and that performs radio communication with a user device, and to a communication control method.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) and the like is being considered.

In the NR, as an example of the configuration of a radio base station (gNB), a so-called C-RAN type radio base station that includes a central unit (Central Unit (CU)) and a distributed unit (Distributed Unit (DU)) that is installed at a remote location from the installation location of the central unit, is being considered.

Specifically, Higher Layer Split (HLS) in which only a radio resource control layer (RRC) and a packet data convergence protocol layer (PDCP) are provided in the CU and a radio link control layer (RLC) and below are arranged in the DU is being considered.

Moreover, assuming that the HLS is employed, it is suggested to manage parameters in the units of a user device (User Equipment, UE) in the CU and manage parameters in the units of a cell in the DU (see Non-Patent Document 1).

In this proposal, because the CU can maintain UE capability and information (e.g., UE classification, QoS Class Identifier (QCI), and the like) from a core network, it is possible to set UE specific parameters. Moreover, by avoiding management of information of resource relating to the DU in the CU as much as possible, because mutual dependence between the CU and the DU can be suppressed, easy implementation of operation by multivendor is expected.

PRIOR ART DOCUMENT

Non-Patent Document

Non-Patent Document 1: "On the functional distribution over the F1 interface", R3-171727, 3GPP TSG-RAN WG3 #96, 3GPP, May 2017

SUMMARY OF THE INVENTION

However, the following problems exist in the method of assortment of the parameters between the CU and the DU disclosed in Non-Patent Document 1. For example, when the parameters in the units of the UE and parameters related to resource allocation are managed individually and discretely in the CU and the DU, a coordination between the parameters (e.g., Measurement Gap, Discontinuous Reception (DRX)) becomes difficult.

The present invention has been made in view of the above discussion. One object of the present invention is, with a premise that the parameters in the units of the user device (UE) are managed in the central unit (CU) and the parameters in the units of the cell are managed in the distributed unit (DU), to provide a radio base station and a communication control method capable of easily implementing a coordination between the parameters.

A radio base station according to one aspect of the present invention is a radio base station (radio base station 200) including a first device (central unit 210) and a second device (distributed unit 260) and that performs radio communication with a user device (user device 300). The first device includes a first parameter holding unit (parameter holding unit 215) that holds a plurality of parameters for controlling the radio communication. The second device includes a second parameter holding unit (parameter holding unit 265) that holds a plurality of parameters for controlling the radio communication. The radio base station includes a parameter managing unit (parameter managing unit 213 or parameter managing unit 263) that manages the parameters held by the first parameter holding unit and the second parameter holding unit. The parameter managing unit causes a coordination necessary parameter, which is a parameter for which a coordination is necessary between the plurality of the parameters, to be held in only one of the first parameter holding unit and the second parameter holding unit.

A communication control method according to another aspect of the present invention is a communication control method implemented in a radio base station including a first device and a second device and that performs radio communication with a user device. The communication control method includes holding in which the first device holds a plurality of parameters for controlling the radio communication; holding in which the second device holds a plurality of parameters for controlling the radio communication; and managing in which the radio base station manages the parameters to be held by the first device and the second device. The managing includes causing a coordination necessary parameter, which is a parameter for which a coordination is necessary between the plurality of the parameters, to be held in only one of the first device and the second device.

BRIEF DESCRIPTION OF DRAWINGS

FIG. 8 is a schematic view showing a management example in the radio base station 200 of target parameters.

MODES FOR CARRYING OUT THE INVENTION

Figure 1:
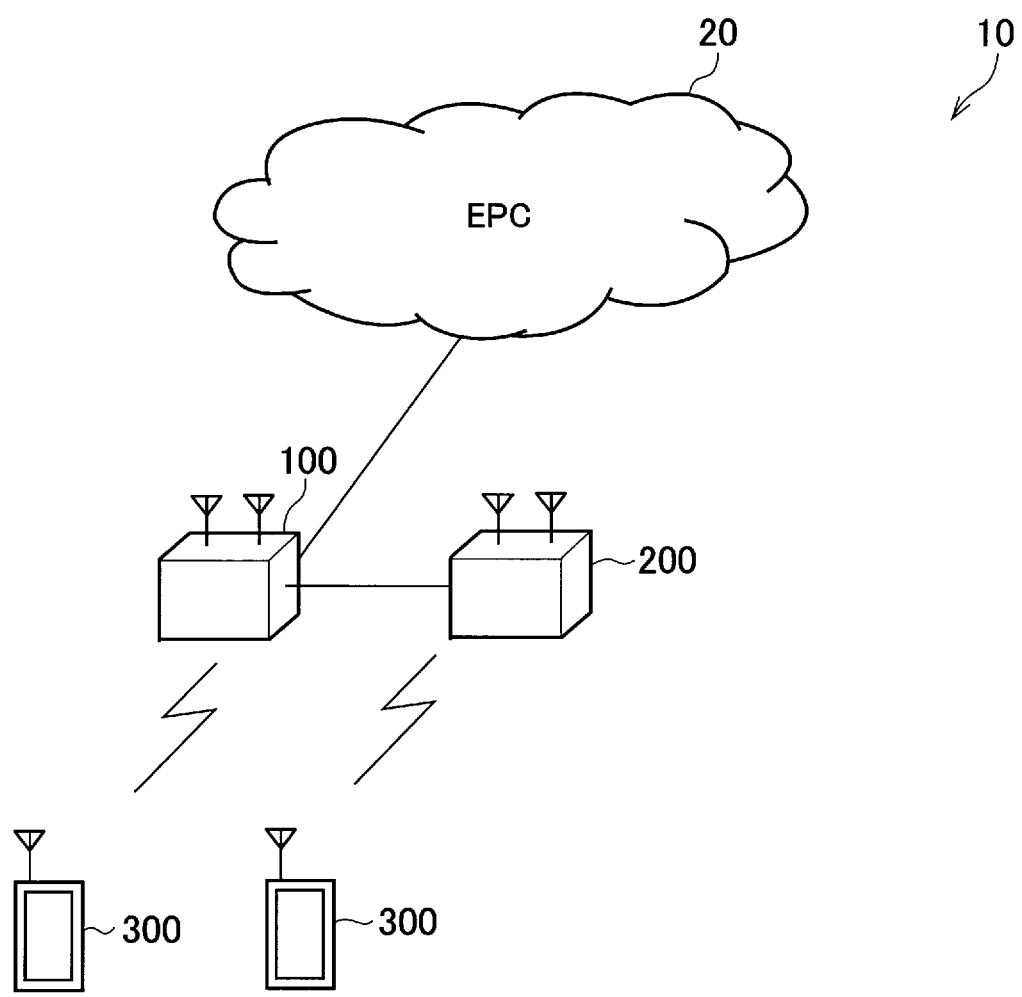
FIG. 1 is an overall structural diagram of a radio communication system 10.

Exemplary embodiments are explained below with reference to the accompanying drawings. In the drawings, structural element shaving the same or similar functions or same or similar configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system in accordance with Long Term Evolution (LTE), and 5G (NR) which is a succeeding system of the LTE.

In the present embodiment, the LTE (including LTE-Advanced) will be appropriately called "4G" to show the correspondence thereof with 5G. Moreover, in the present embodiment, LTE assisted operation in which 5G supplements 4G is implemented by the radio communication system 10.

The radio communication system 10 includes a core network 20, a radio base station 100, a radio base station 200, and one or more user devices 300.

The core network 20 is also called Evolved Packet Core (EPC) and is constituted by a mobility management entity (MME), a serving gateway (S-GW), PDN gateway (P-GW), and the like.

The radio base station 100 is a radio base station in accordance with the 4G and is also called eNodeB. The radio base station 100 is connected to a device (node) constituting the core network 20 via S1-MME or S1-U interface.

The radio base station 200 is a radio base station in accordance with the 5G and is also called gNodeB. The radio base station 200 is connected to the radio base station 100 via X2 interface (below conveniently referred to as X2-AP', X2-U').

The user device 300 (UE) can perform radio communication with the radio base station 100 and the radio base station 200. The user device 300 may be called a radio communication terminal or a mobile station. The radio base station 200 and the user device 300 can be caused to support, by controlling a radio signal transmitted by a plurality of antenna elements, Massive MIMO that generates a beam having higher directivity, carrier aggregation (CA) that uses a plurality of component carriers (CC), dual connectivity (DC) in which a component carrier is transmitted at the same time between a plurality of radio base stations and the user device 300, and the like.

Figure 2:
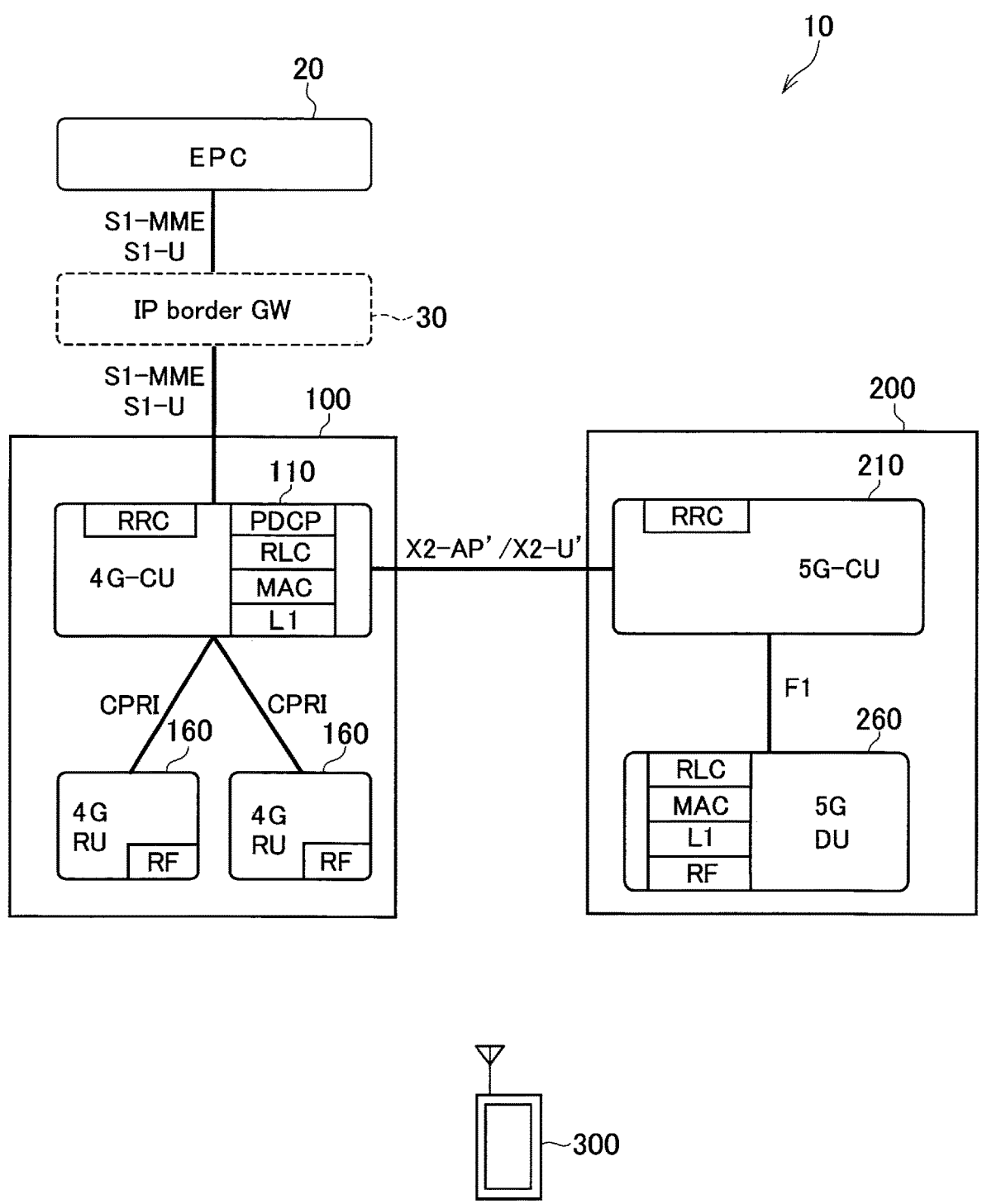
FIG. 2 is an overall block diagram of the radio communication system 10.

FIG. 2 is an overall block diagram of the radio communication system 10. As shown in FIG. 2, the radio base station 100 includes a central unit 110 and one or more remote units 160. The radio base station 200 includes a central unit 210 and a distributed unit 260. It is allowable that each of the radio base station 100 and the radio base station 200 includes one or more devices other than the central unit and the distributed unit.

In the present embodiment, the central unit 210 constitutes a first device and the distributed unit 260 constitutes a second device.

The central unit 110 includes a radio physical layer (L1), a medium access control layer (MAC), a radio link control layer (RLC), and a packet data convergence protocol layer (PDCP). Moreover, the central unit 110 includes a radio resource control layer (RRC) as an upper layer of the PDCP.

The remote unit 160 can be installed at a site that is remote from the central unit 110. The remote unit 160 includes a radio unit (RF) such as PA (Power Amplifier)/LNA (Low Noise Amplifier), a radio transmission-reception module, and a modulation-demodulation module.

The central unit 110 is called a digital processing unit (Digital Unit (DU)) or Central Unit (CU), and the remote unit 160 is called a radio processing unit (Radio Unit (RU)) or Remote Unit (RU). The central unit 110 and the remote unit 160 are connected to each other via a wired transmission path called a front-haul. For example, Common Public Radio Interface (CPRI) is used as an interface between the central unit 110 and the remote unit 160.

Although the central unit 210 and the distributed unit 260 respectively correspond to the central unit 110 and the remote unit 160, the layer configurations thereof are different.

Specifically, the central unit 210 includes a radio resource control layer (RRC). On the other hand, the distributed unit 260 includes a radio link control layer (RLC), a medium access control layer (MAC), a radio physical layer (L1), and a radio unit (RF).

A layer separation between such central unit 210 and distributed unit 260 is called Higher Layer Split (HLS). Moreover, the central unit 210 is called Central Unit (CU) and the distributed unit 260 is called Distributed Unit (DU).

As described above, the central unit 210 is connected to the central unit 110 via X2-AP', X2-U' interface.

More specifically, in the HLS, it is assumed that the central unit 210 (CU) performs the processing of RRC/Service Data Adaptation Protocol (SDAP)/PDCP layer, and the distributed unit 260 (DU) performs the processing of the layer RLC or below.

In the below explanation, the central unit 210 and the distributed unit 260 will be suitably abbreviated to the CU and the DU, respectively.

(2) Functional Block Configuration of Radio Communication System

A functional block configuration of the radio communication system 10 is explained below. Specifically, a functional block configuration of the central unit 210 and the distributed unit 260 is explained below.

(2.1) Central Unit 210

Figure 3:
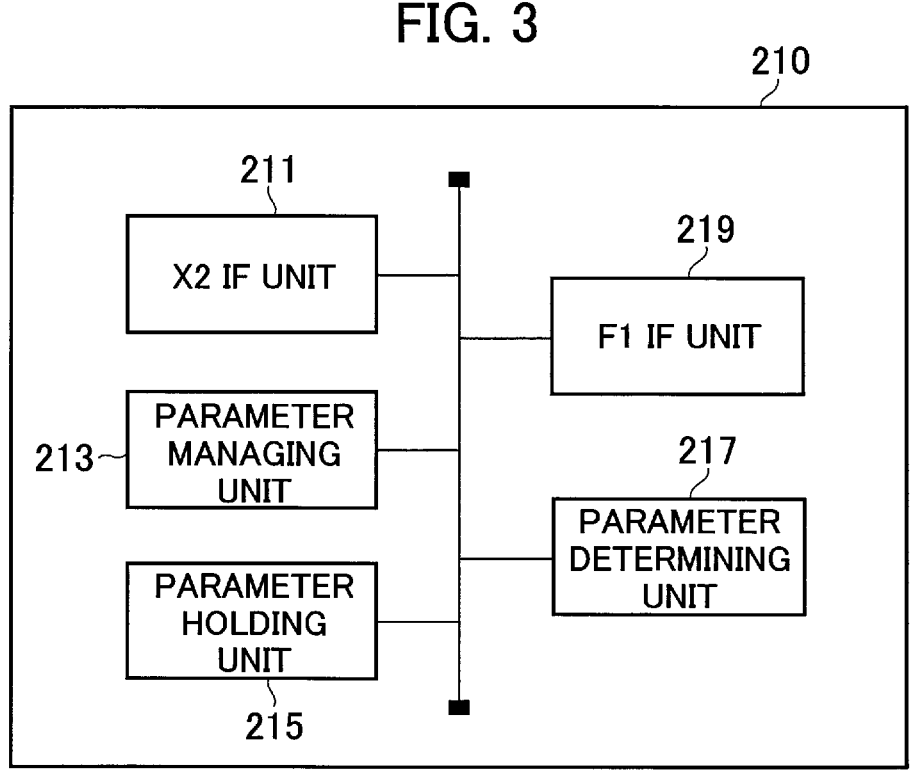
FIG. 3 is a functional block diagram of a central unit 210.

FIG. 3 is a functional block diagram of the central unit 210. As shown in FIG. 3, the central unit 210 includes X2 IF unit 211, a parameter managing unit 213, a parameter holding unit 215, a parameter determining unit 217, and F1 IF unit 219.

The X2 IF unit 211 provides an interface for realizing a communication with the central unit 110. Specifically, the X2 IF unit 211 is an interface (X2) for directly connecting the central unit 110 and the central unit 210 to each other. Data transmitted from and received by the user device 300 is relayed to the radio base station 100 via the X2 IF unit 211.

The parameter managing unit 213 manages various parameters held by the parameter holding unit 215, specifically, parameters for controlling radio communication with the user device 300. The parameter managing unit 213 can manage various parameters held not only in the parameter holding unit 215 but also in a parameter holding unit 265 (see FIG. 4) of the distributed unit 260.

That is, the parameter managing unit 213 can manage the parameters held in the parameter holding unit 215 and the parameter holding unit 265.

The parameter managing unit 213 causes, among a plurality of parameters, parameters for which the coordination is necessary (hereinafter, "coordination necessary parameter") between a plurality of the parameters, to be held in only one of the parameter holding unit 215 and the parameter holding unit 265.

The coordination necessary parameter is a parameter for which synchronization of recognition must be done between the CU and the DU, and, for example, for the time being assuming that the DU determined and managed content (set value) of the parameter, that content must be notified from the DU to the CU. In this case, the content of the parameter must be notified from the CU to the user device 300.

In the present embodiment, a control and an interface to perform coordination of the parameters in the units of the user device (UE) and the parameters related to the resource allocation between the CU and the DU are provided.

As long as the coordination necessary parameter is a parameter for the radio communication control with the user device 300 fulfilling the above mentioned specification, it is not particularly limited. However, the following parameters can be typically listed.

FIG. 8 is a schematic view showing a management example in the radio base station 200 of target parameters. As shown in FIG. 8, a cell quality metrology interval (Measurement Gap), discontinuous reception (Discontinuous Reception (DRX)), and resource dedicated to uplink (UL dedicated resource), specifically, Physical Uplink Control Channel (PUCCH), Cell-specific Reference Signal (CRS), and Sounding Reference Signal (SRS), can be listed as the coordination necessary parameters.

Moreover, a transmission timing of notification information (System Information Block) and a transmission/reception timing of Channel State Information (CSI-RS) are also the coordination necessary parameter.

The parameter managing unit 213 manages the coordination necessary parameters in only one of the CU and the DU. As shown in FIG. 8, in a later-explained Operation Example 1, the coordination necessary parameters are managed, that is, the coordination necessary parameters are held in the DU. On the other hand, in a later-explained Operation Example 2, the coordination necessary parameters are managed, that is, the coordination necessary parameters are held in the CU.

Moreover, as shown in FIG. 8, in the present embodiment, in line with the proposal in Non-Patent Document 1, the parameters in the units of the UE are managed in the CU (Yes in figure) and the parameters in the units of the cell are managed in the DU. Note that, a specific management method of the coordination necessary parameters will be explained later.

The parameter managing unit 213 can cause a part of the coordination necessary parameters to be held only in one of the parameter holding unit 215 and the parameter holding unit 265. Specifically, the parameter managing unit 213 can, while managing in the CU a part of the parameters in the units of the UE for which the coordination is necessary among the parameters, notify the DU of those parameters.

The DU determines content of the parameters relating to the resource allocation based on the parameters that are notified thereto. The DU notifies the CU of the determined content of the parameters.

As an example of such parameter, a case in which the CU notifies the DU of DRX cycle of the user device 300, and the DU performs the coordination relating to the resource allocation parameters based on the DRX cycle and determines the content of the resource allocation parameters can be mentioned.

The parameter holding unit 215 can hold a plurality of parameters for controlling the radio communication with the user device 300. In the present embodiment, the parameter holding unit 215 constitutes a first parameter holding unit.

Specifically, the parameter holding unit 215 holds, deletes, or updates the parameters based on a control by the parameter managing unit 213 (or a later-explained parameter managing unit 263).

The parameter determining unit 217 determines the content of the coordination necessary parameters (e.g., DRX cycle) in the units of the UE. Particularly, when the parameter managing unit 213 manages so that the coordination necessary parameters are held only in the parameter holding unit 215, it is preferable that the parameter determining unit 217 determines the content of the parameters in the units of the UE.

The F1 IF unit 219 provides an interface for realizing a communication between the central unit 210 and the distributed unit 260. Specifically, the F1 IF unit 219 is an interface (hereinafter, "F1") that directly connects the central unit 210 to the distributed unit 260. The transmitted and received data of the user device 300 is relayed to the distributed unit 260 via the F1 IF unit 219.

(2.2) Distributed Unit 260

Figure 4:
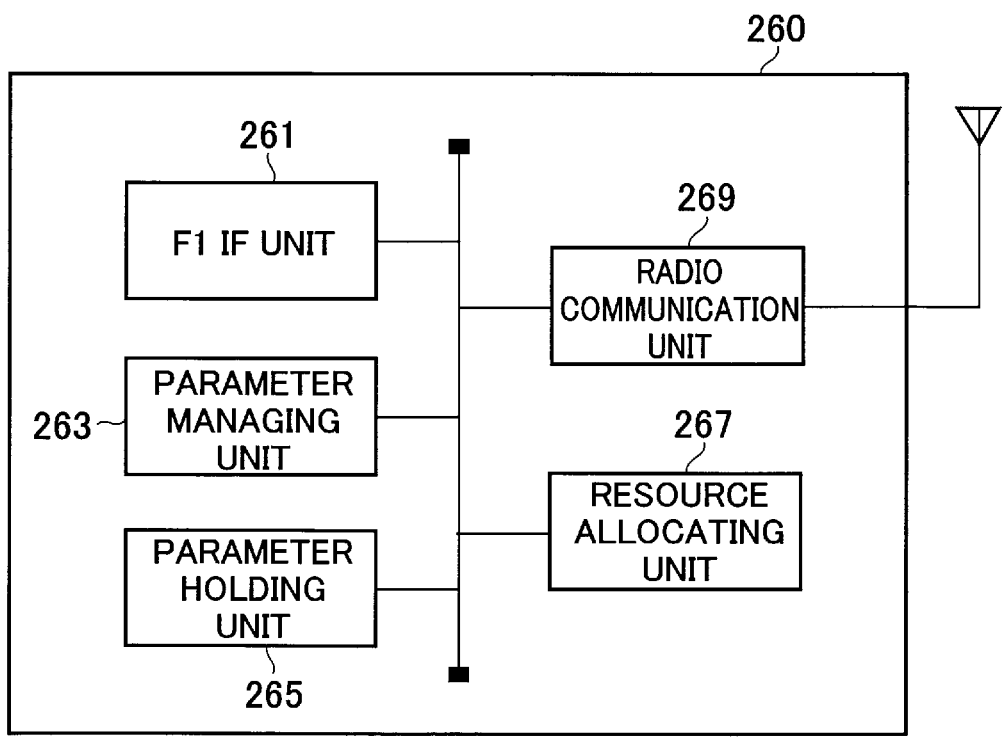
FIG. 4 is a functional block diagram of a distributed unit 260.

FIG. 4 is a functional block diagram of the distributed unit 260. As shown in FIG. 4, the distributed unit 260 includes F1 IF unit 261, the parameter managing unit 263, the parameter holding unit 265, a resource allocating unit 267, and a radio communication unit 269. The explanation of the functions of the distributed unit 260 that are similar to those of the central unit 210 will be suitably omitted.

The F1 IF unit 261, like the F1 IF unit 219, provides an interface for realizing a communication between the central unit 210 and the distributed unit 260.

The parameter managing unit 263 has the same function as the parameter managing unit 213. That is, the parameter managing unit 263 can manage the parameters held in the parameter holding unit 215 and the parameter holding unit 265.

Note that, it is allowable that one of the parameter managing unit 213 and the parameter managing unit 263 becomes active and manages the parameters by directly controlling the parameter holding unit 215 and the parameter holding unit 265. Alternatively, both the parameter managing unit 213 and the parameter managing unit 263 can operate in cooperation and each of the parameter managing unit 213 and the parameter managing unit 263 can control the parameter holding unit arranged in the same unit.

The parameter holding unit 265, like the parameter holding unit 215, can maintain a plurality of the parameters for controlling the radio communication with the user device 300. In the present embodiment, the parameter holding unit 265 constitutes a second parameter holding unit.

The resource allocating unit 267 performs the resource allocation to the user device 300. Specifically, the resource allocating unit 267 allocates the radio resources such as frequency and time to the user device 300. Particularly, when the parameter managing unit 263 manages so that the coordination necessary parameters are held only in the parameter holding unit 265, it is preferable that the resource allocating unit 267 performs the resource allocation to the user device 300.

The radio communication unit 269 performs the radio communication with the user device 300. Specifically, the radio communication unit 269 performs the radio communication with the user device 300 according to the specification of the 5G. As mentioned earlier, the F1 IF unit 261 can support the Massive MIMO, the carrier aggregation (CA), the dual connectivity (DC), and the like.

(3) Operation of Radio Communication System

An operation of the radio communication system 10 is explained below. Specifically, an operation performed when the radio base station 200 manages the various parameters for the radio communication control with the user device 300 is explained below.

(3.1) Outline of Operation

Figure 5:
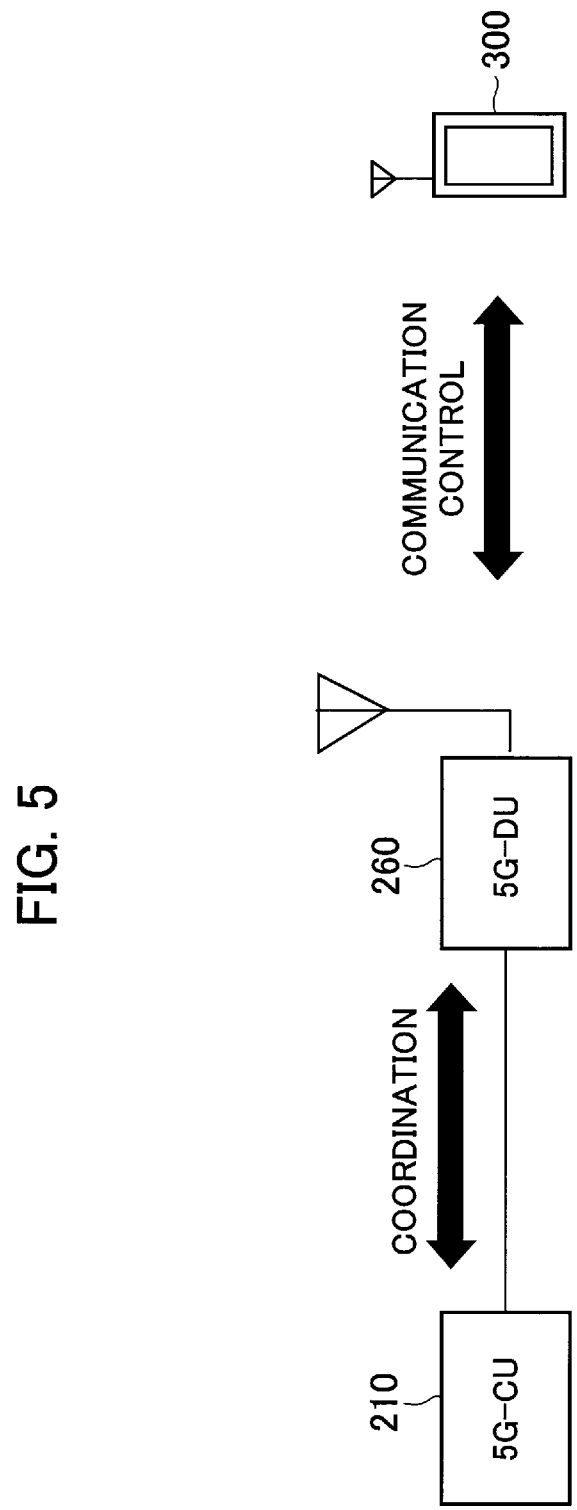
FIG. 5 is a conceptual diagram of a management operation of coordination necessary parameters performed by the central unit 210 and the distributed unit 260.

FIG. 5 is a conceptual diagram of a management operation of the coordination necessary parameters performed by the central unit 210 and the distributed unit 260.

As shown in FIG. 5, a coordination, that is, exchanges of information, necessary for determining the content of the coordination necessary parameters is performed between the central unit 210 (CU) and the distributed unit 260 (DU).

The distributed unit 260 performs the communication control of the user device 300 based on the content of the coordination necessary parameters determined as a result of the coordination.

(3.2) Operation Example 1

Then, an example of a management operation of the radio communication control parameters including the coordination necessary parameters is explained below.

Figure 6:
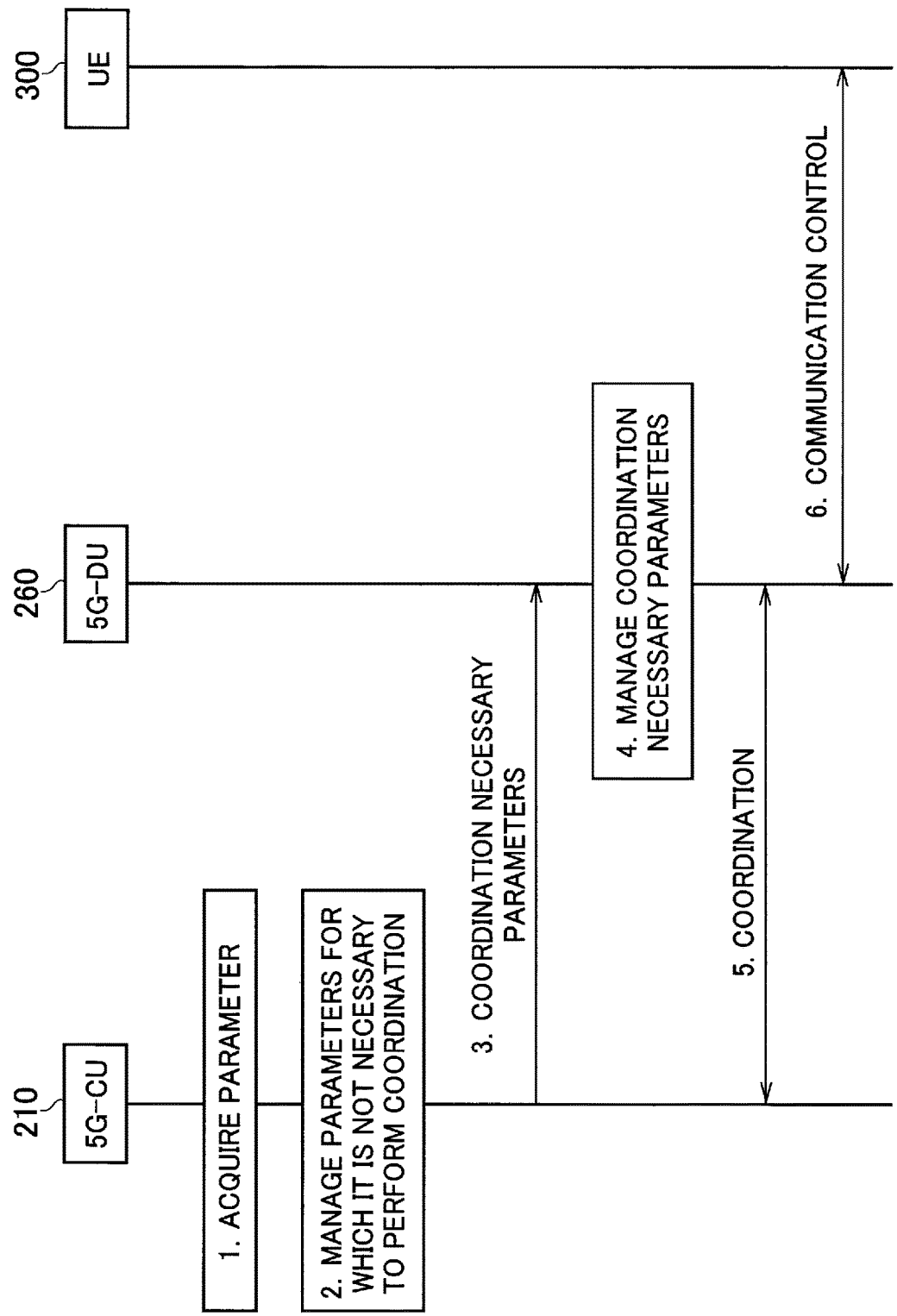
FIG. 6 is a schematic view of a management sequence of radio communication control parameters including the coordination necessary parameters (Operation Example 1).

FIG. 6 is a schematic view of a management sequence of the radio communication control parameters including the coordination necessary parameters (Operation Example 1). In this operation example, the management (holding) of the coordination necessary parameter is performed in the distributed unit 260 (DU). In this operation example, the DU performs the resource allocation.

As shown in FIG. 6, the central unit 210 acquires the radio communication control parameter (Step 1). A root from which the parameters are acquired is not limited; however, in this example, it is assumed that the parameters are acquired via the radio base station 100.

The central unit 210 manages the parameters in the units of the UE (see FIG. 8) among the parameters for which it is not necessary to perform coordination (Step 2). Moreover, the central unit 210 notifies the distributed unit 260 of the coordination necessary parameters (Step 3). The distributed unit 260 manages the coordination necessary parameters (Step 4).

The central unit 210 and the distributed unit 260 perform the coordination of the coordination necessary parameter (Step 5).

For example, the DU can notify the CU of the determined parameter as response to Request from the CU to the DU. Alternatively, in the Request from the CU, it may be notified that the coordination of the parameters is necessary and the coordination of which parameters is necessary. Moreover, along with the notification of the parameters from the DU, it may be notified that the coordination of those parameters is performed.

The distributed unit 260 performs the communication control of the user device 300 based on the content of the parameters determined as a result of the coordination (Step 6).

(3.3) Operation Example 2

Figure 7:
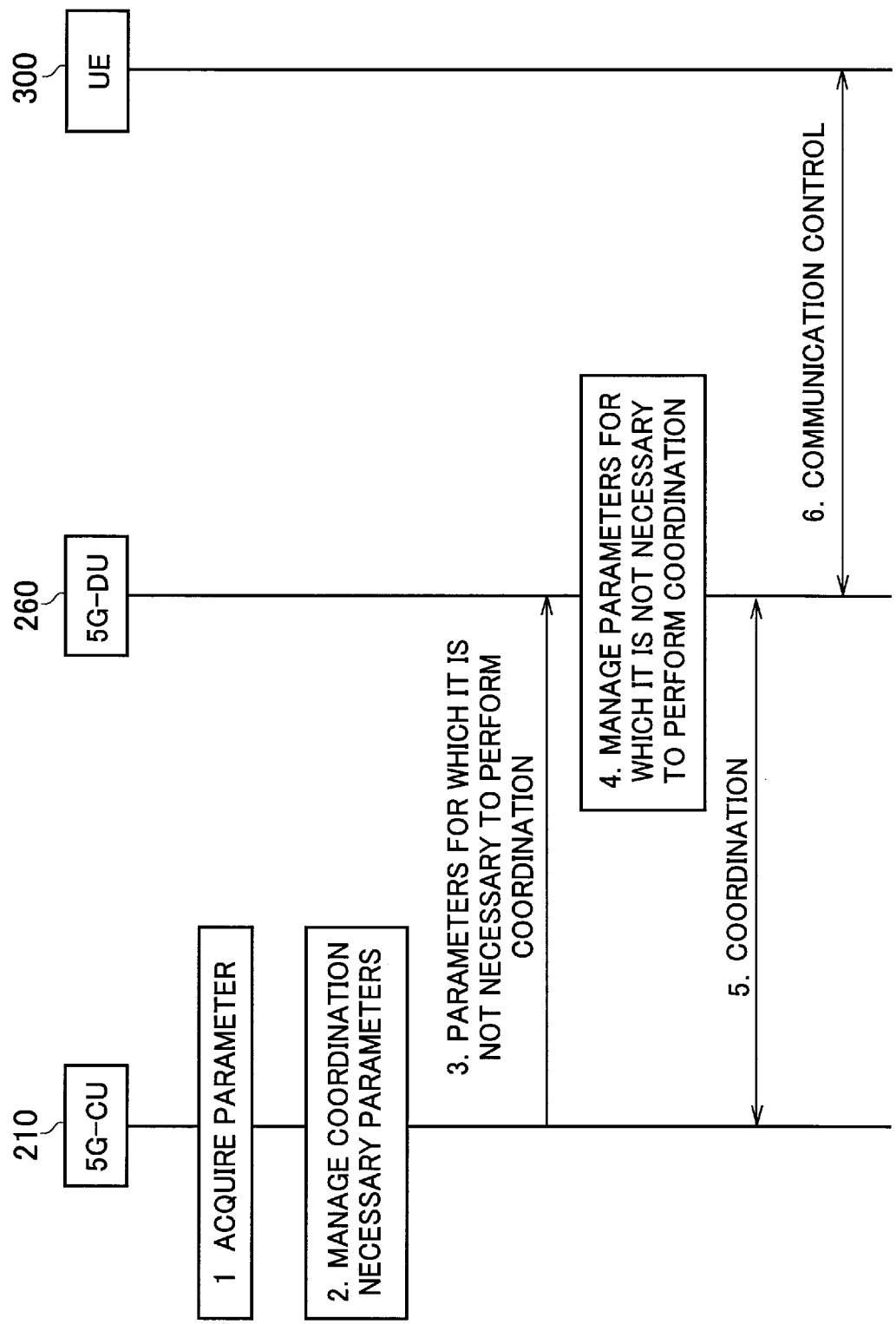
FIG. 7 is a schematic view of a management sequence of radio communication control parameters including the coordination necessary parameters (Operation Example 2).

FIG. 7 is a schematic view of a management sequence of the radio communication control parameters including the coordination necessary parameters (Operation Example 2). In this operation example, the management (holding) of the coordination necessary parameter is performed in the central unit 210 (CU). Moreover, in this operation example, the CU determines the content of the parameters in the units of the UE. The different portions with respect to Operation Example 1 will be mainly explained here.

As shown in FIG. 7, the central unit 210 manages the coordination necessary parameters (Step 2). Moreover, the central unit 210 notifies the distributed unit 260 of the parameters in the units of the cell (see FIG. 8) among the parameters that do not require coordination (Step 3). The distributed unit 260 manages the parameters in the units of the cell notified thereto (Step 4). Thereafter, the coordination and communication control are performed in the same manner as in Operation Example 1.

(4) Effects and Advantages

According to the present embodiment, the following effects and advantages can be obtained. Specifically, the radio base station 200 (the parameter managing unit 213 or the parameter managing unit 263) can cause only one between the central unit 210 (the parameter holding unit 215) and the distributed unit 260 (the parameter holding unit 265) to hold the coordination necessary parameters that are the parameters for which it is necessary to perform a coordination between a plurality of the communication control parameters.

Therefore, the parameters for which the coordination is necessary among the parameters are accumulated in one of the central unit 210 and the distributed unit 260. Accordingly, a situation that it is difficult to perform the coordination between the parameters (e.g., Measurement Gap, Discontinuous Reception (DRX)) can be evaded.

That is, in the radio base station 200, with a premise that the parameters in the units of the user device (UE) are managed in the central unit 210 (CU) and the parameters in the units of the cell are managed in the distributed unit 260 (DU), the coordination between the parameters can be implemented easily.

In the present embodiment, only the DU (the parameter holding unit 265) is caused to hold the coordination necessary parameters, and the DU can perform the resource allocation to the user device 300.

Therefore, the DU can quickly perform the resource allocation to the user device 300 based on a result of the coordination of the coordination necessary parameters.

In the present embodiment, only the CU (the parameter holding unit 215) is caused to hold the coordination necessary parameters, and the CU can determine the content of the coordination necessary parameter in the units of the user device 300.

Therefore, the CU can quickly determine the content of the coordination necessary parameter based on a result of the coordination of the coordination necessary parameters.

In the present embodiment, only one of the central unit 210 (the parameter holding unit 215) and the distributed unit 260 (the parameter holding unit 265) can be caused to hold a part of the coordination necessary parameters.

Specifically, while managing in the CU the part of the parameters for which the coordination among the parameters is necessary, it is possible to notify the DU of those parameters. Inverse of this is also possible.

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, in the above embodiments, Higher Layer Split (HLS) was premised, but in the present invention the HLS is not necessarily the premise. Specifically, the present invention can be applied not only to a split between PDCP-RLC, like in the HLS, but also a split between RLC-MAC.

In the above embodiment, an example of management in which the parameters in the units of the UE are managed in the central unit 210 (CU) and the parameters in the units of the cell are managed in the distributed unit 260 (DU) is explained; however, such management is not necessary.

In the above embodiment, an example in which DRX configuration (DRX Config) is managed (controlled), for coordination, by the DU, has been explained; however, because a part of the parameters of the DRX Config are also managed in the CU, a part (e.g., drxStartOffset) or all of the DRX Config may be controlled, for coordination, by the DU.

Furthermore, in the above embodiment, a management example of the coordination necessary parameter for which the coordination among the parameters is necessary has been explained; however, the management of the parameter by the central unit 210 (CU) and the distributed unit 260 (DU) can be performed in the following manner.

Specifically, because radio resource allocation is a cell-related process (cell process), it is preferable that the DU performs the management of the related parameters. However, some of the parameters relating to UE-related process (UE process) require cooperation with the radio resource allocation. Therefore, it is necessary to prescribe a procedure of F1 interface to enable cooperation between the CU and the DU.

As the parameters that require cooperation with the radio resource allocation, the above-mentioned Measurement Gap and the DRX-related parameters can be listed.

In view of the above situations, the following solution can be considered. Specifically, the DU manages the parameters relating to the UE process that require cooperation with the radio resource allocation and notifies the CU of those parameters via F1-Control Plane (F1-C) interface. For example, the DU can notify the CU of the parameter as a response to Request from the CU (Proposal 1).

Moreover, the DU can perform the radio resource allocation depending on the parameters relating to the UE process and managed by the CU. The CU notifies the DU of the parameters relating to the UE process that require cooperation with the radio resource allocation via the F1-C interface (Proposal 2). Furthermore, the CU manages the radio resource allocation and the parameters relating to the UE process that require cooperation with the radio resource allocation (Proposal 3).

By this management method, a required cooperation between the determination of the parameters relating to the UE process and the radio resource allocation becomes possible, and this can lead to improvement of wireless characteristic.

For example, by making arrangement so that the Measurement Gap does not overlap with the allocated radio resource, deterioration of user throughput can be evaded. Moreover, by overlapping the radio resource allocated as a trigger of transmission and reception of the UE in the DRX, efficiency of the data transmission and reception in the DRX can be further improved.

Moreover, other than the parameters mentioned above, the DU can manage the parameters that are determined based on the policy of MAC scheduler (e.g., Buffer Status Report (BSR), Power Headroom Report (PHR)) even if those parameters are the parameters in the units of the UE.

Furthermore, the parameters related to the resource allocation set (configured) in the RRC can be managed by the DU. Moreover, with respect to bearer-related parameters, the CU can manage the parameters of RLC and the DU can manage a logical channel group (LCG). Furthermore, the DU can manage the parameters of RRC/MAC for which a coordination with the UE specific resource is necessary. Moreover, the DU may manage the parameters of MAC relating to scheduling.

Note that, words "manage" and "management" can be replaced with "control".

Moreover, the block diagrams used for explaining the embodiments (FIGS. 3 and 4) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 9:
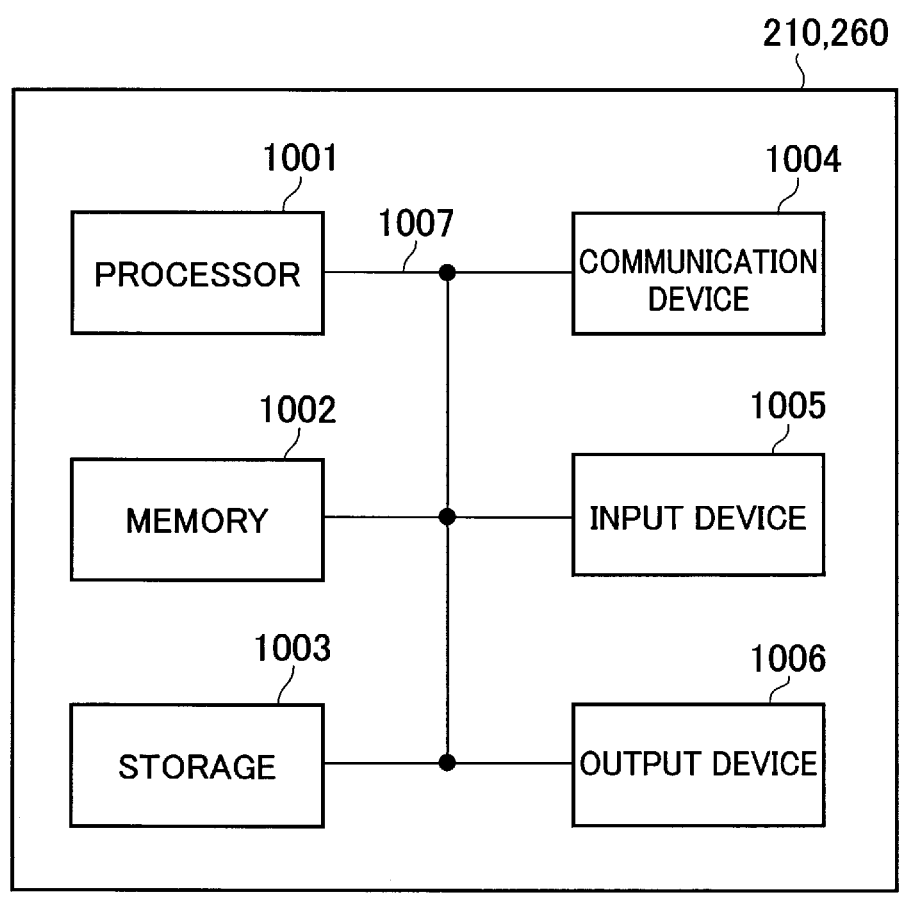
FIG. 9 is a figure showing an example of hardware configuration of the central unit 210 and the distributed unit 260.

Furthermore, the central unit 210, and the distributed unit 260 (devices) explained above can function as a computer that performs the processing of the present invention. FIG. 9 is a diagram showing an example of a hardware configuration of the devices. As shown in FIG. 9, each of the devices can be configured as a computer device including a processor 1001, a memory 1002, a storage 1003, a communication device 1004, an input device 1005, an output device 1006, and a bus 1007.

The functional blocks of the devices (see FIGS. 3 and 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage

1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the radio base station 200 can be performed by another network node (device). Moreover, functions of the radio base station 200 can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The radio base station 100 and the radio base station 200 can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), gNodeB (gNB), an access point, a femtocell, a small cell, and the like.

The user device 300 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

The radio base station and the communication control method, with a premise that the parameters in the units of the user device (UE) are managed in the central unit (CU) and the parameters in the units of the cell are managed in the distributed unit (DU), are useful for easily implementing a coordination between the parameters.

EXPLANATION OF REFERENCE NUMERALS

10 Radio communication system
20 Core network
100 Radio base station
110 Central unit
160 Remote unit 200 Radio base station
210 Central unit
211 X2 IF unit
213 Parameter managing unit
215 Parameter holding unit
217 Parameter determining unit
219 F1 IF unit
260 Distributed unit
261 F1 IF unit
263 Parameter managing unit
265 Parameter holding unit
267 Resource allocating unit
269 Radio communication unit
300 User device
1001 Processor
1002 Memory
1003 Storage
1004 Communication device
1005 Input device
1006 Output device
1007 Bus

The invention claimed is:

1. A radio base station comprising a first device and a second device, the radio base station performing radio communication with a terminal, wherein
the first device includes a first memory that holds first parameters for controlling the radio communication over an F1 interface,
the second device includes a second memory that holds second parameters for controlling the radio communication over the F1 interface,
the radio base station includes a first processor that manages the first parameters held by the first memory and the second parameters held by the second memory, and
the first processor causes a coordination necessary parameter, which is a parameter for which a coordination is necessary between the first and second parameters, to be held in only the second memory,
wherein the coordination necessary parameter comprises a measurement gap,
wherein the second device includes a second processor that performs resource allocation with respect to the terminal based on the coordination necessary parameter, and
wherein the first parameters for controlling the radio communication over the F1 interface include a Radio Resource Control (RRC) message transferred over an F1-Control Plane (F1-C) interface.

2. The radio base station as claimed in claim 1, wherein the first processor further determines content of the coordination necessary parameter in units of the terminal.

3. The radio base station as claimed in claim 1, wherein the first processor causes a part of coordination necessary parameters to be held in only one of the first memory and the second memory.

4. A communication control method implemented in a radio base station comprising a first device and a second device, the radio base station performing radio communication with a terminal, the communication control method comprising:
holding, by the first device, first parameters for controlling the radio communication over an F1 interface;
holding, by the second device, second parameters for controlling the radio communication over the F1 interface; and
managing, using a first processor of the radio base station, the first parameters held by the first device and the second parameters held by the second device,
wherein the managing includes causing a coordination necessary parameter, which is a parameter for which a coordination is necessary between the first and second parameters, to be held in only the second device,
wherein the coordination necessary parameter comprises a measurement gap,
wherein the second device performs resource allocation with respect to the terminal based on the coordination necessary parameter, and
wherein the first parameters for controlling the radio communication over the F1 interface include a Radio Resource Control (RRC) message transferred over an F1-Control Plane (F1-C) interface.

* * * * *